(12) United States Patent
Choi et al.

(10) Patent No.: US 9,650,510 B2
(45) Date of Patent: *May 16, 2017

(54) RESIN BLEND

(71) Applicant: LG CHEM, LTD., Seoul (KR)

(72) Inventors: Eun Joo Choi, Daejeon (KR); Jin Young Ryu, Daejeon (KR); Woo Sung Kim, Daejeon (KR); Houng Sik Yoo, Seoul (KR); Han Na Lee, Daejeon (KR); Hyeon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,417

(22) Filed: May 23, 2014

(65) Prior Publication Data

US 2014/0255700 A1  Sep. 11, 2014

Related U.S. Application Data

(63) Continuation of application No. PCT/KR2012/010057, filed on Nov. 26, 2012.

(30) Foreign Application Priority Data

Nov. 25, 2011 (KR) .......................... 10-2011-0124652

(51) Int. Cl.

| C08L 33/00 | (2006.01) |
|---|---|
| C08L 33/12 | (2006.01) |
| C08J 3/12 | (2006.01) |
| B32B 27/08 | (2006.01) |
| B32B 27/28 | (2006.01) |
| C08F 283/12 | (2006.01) |
| C08L 101/02 | (2006.01) |

(52) U.S. Cl.
CPC ............. *C08L 33/12* (2013.01); *B32B 27/08* (2013.01); *B32B 27/283* (2013.01); *C08F 283/12* (2013.01); *C08J 3/126* (2013.01); *C08L 101/02* (2013.01); *C08J 2483/04* (2013.01); *Y10T 428/2998* (2015.01); *Y10T 428/31663* (2015.04)

(58) Field of Classification Search
CPC ...................................................... C08L 33/12
See application file for complete search history.

(56) References Cited

U.S. PATENT DOCUMENTS

| 3,787,238 A * | 1/1974 | Juliano .................. H01J 29/28 250/488.1 |
|---|---|---|
| 4,692,492 A * | 9/1987 | Gunesin ................ C08F 279/02 524/731 |
| 5,690,859 A * | 11/1997 | Takayanagi ............. C08L 67/00 252/299.01 |
| 6,534,594 B1 * | 3/2003 | Kimura ................. C08F 265/04 524/268 |
| 8,658,737 B2 * | 2/2014 | Yamagishi .............. C08L 33/08 525/100 |
| 9,090,763 B2 * | 7/2015 | Ryu ....................... C08L 101/04 |
| 2006/0018856 A1 * | 1/2006 | Bosman ............... A61K 8/0229 424/70.12 |
| 2008/0199418 A1 * | 8/2008 | Koroskenyi ........... A61K 8/898 424/70.12 |
| 2008/0306222 A1 | 12/2008 | Sanada et al. |
| 2009/0099291 A1 * | 4/2009 | Jia ..................... C08G 18/3893 524/425 |

FOREIGN PATENT DOCUMENTS

| CN | 101381496 | 3/2009 |
|---|---|---|
| JP | 2001-049078 A | 2/2001 |
| KR | 10-2011-0003061 A | 1/2011 |
| KR | 10-2011-0026318 A | 3/2011 |
| KR | 10-2011-0059173 A | 6/2011 |
| WO | 96/07704 A1 | 3/1996 |

OTHER PUBLICATIONS

Keestra et al., "Two component injection molding of phase separating blends" International Polymer Processing, vol. 21, No. 2. pp. 168-174 (2006).
Matthias Schnell et al., "Evolution of viscosities and morphology for the two-phase system polyethylene oxide/poly (dimethylsiloxane)"; Rheol Acta, vol. 47, pp. 469-476 (2008).
XP-002744624: "Weather-resistant coatings comprising blends of lightfast polymers and hydrophobic polymers," Jpn. Kokai Tokkyo Koho.

* cited by examiner

*Primary Examiner* — Irina Krylova
(74) *Attorney, Agent, or Firm* — Dentons US LLP

(57) ABSTRACT

Provided are a resin blend including a first resin, and a second resin having a hydrophobic moiety represented by Formula 1 at a main chain and having a difference in surface energy from the first resin at 25° C. of 0.1 to 20 mN/m, and formed in a layer-separated structure, a pellet, a method of manufacturing the same, and a resin molded article having a specific layer-separated structure. Because of the resin blend, a molded product may have enhanced mechanical properties and surface hardness, and additional surface coating may be omitted, thereby reducing a processing time, increasing productivity, and reducing production costs.

11 Claims, 4 Drawing Sheets

RESIN BLEND

This application is a Continuation Bypass Application of International Application No. PCT/KR2012/010057 filed on Nov. 26, 2012, and claims priority to Korean Application No. 10-2011-0124652, filed on Nov. 25, 2011, each of which is hereby incorporated by reference in its entirety.

TECHNICAL FIELD

The present application relates to a resin blend, a pellet, a method of manufacturing a resin molded article using the same, and a resin molded article.

BACKGROUND ART

A plastic resin is easily processed, has excellent properties such as tensile strength, elastic modulus, thermal resistance, and impact resistance, and is used in various applications such as automobile parts, helmets, parts of an electric appliance, parts of a spinning machine, toys, or pipes.

Particularly, resins used for home appliances, automobile parts, and toys are in direct contact with a human body, and thus should be environmentally friendly and have excellent surface hardness. However, generally, when a resin is exposed to an external environment for a predetermined time or more, the resin is degraded by oxygen, ozone, or light in the air, and thus is easily discolored. Accordingly, to improve poor weather resistance and low strength of the resin, an additional painting or plating process is generally applied to the resin. However, such a painting or plating process may reduce efficiency and economic feasibility of a process of preparing a plastic resin, and generate a large amount of harmful materials during the painting or plating process or disposal of a product.

Therefore, various methods for enhancing characteristics of the resin such as scratch resistance, thermal resistance, and weather resistance without the painting or plating process. For example, a method of adding inorganic particles into the resin to enhance physical properties such as wear resistance and hardness was suggested. However, processibility of the plastic resin may be reduced by such a method, and impact strength and glossiness may be degraded by the addition of the inorganic particles.

DISCLOSURE

Technical Problem

The present application is directed to providing a resin blend, a pellet, a method of manufacturing a resin molded article using the same, and a resin molded article.

Technical Solution

One aspect of the present application provides a resin blend including a first resin and a second resin having a hydrophobic moiety represented by Formula 1 at a main chain and a difference in surface energy from the first resin at 25° C. of 0.1 to 20 mN/m, and capable of forming a layer-separated structure.

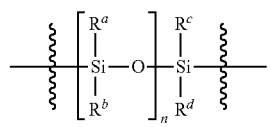

[Formula 1]

In Formula 1, $R^a$ to $R^d$ are each independently an alkyl group having 1 to 16 carbon atoms, and n is a number of 1 to 100.

Another aspect of the present application provides a pellet which includes a core having a first resin, and a shell which has a second resin having a hydrophobic moiety represented by Formula 1 and having a difference in surface energy from the first resin at 25° C. of 0.1 to 20 mN/m.

Still another aspect of the present application provides a resin molded article which includes a first resin layer, a second resin layer formed on the first resin layer, and an interface layer having first and second resins and formed between the first and second resin layers, wherein the second resin layer includes a second resin having the hydrophobic moiety represented by Formula 1 at a main chain.

Yet another aspect of the present application provides a method of manufacturing a resin molded article including forming a melt blend by melting the resin blend, and forming a layer-separated structure by processing the melt blend.

Yet another aspect of the present application provides a method of manufacturing a resin molded article which includes forming a melt blend by melting the pellet, and forming a layer-separated structure by processing the melt blend.

Hereinafter, a resin blend, a pellet, a method of manufacturing a resin molded article using the same, and a resin molded article will be described in further detail with respect to exemplary embodiments of the present application.

In the present application, the "blend" may be a mixture of at least two resins. A type of the blend may include, but is not particularly limited to, at least two resins or at least two kinds of pellets blended in one matrix. Particularly, as shown in FIG. 1, when at least two resins are blended in one matrix, a pellet 10 including a composition of at least two resins 11 may be made. Meanwhile, when at least two kinds of pellets are blended, as shown in FIG. 2, at least two pellets 20 and 21 each having one resin may be blended. The resins may have different physical properties, which may be, a surface energy, melted viscosity, or solubility parameter.

The "melting process" refers to a process of melting a resin blend at a melting temperature (Tm) or more to form a melt blend, and forming a desired molded article using the melt blend, and is, for example, injection molding, extrusion molding, hollow molding, transfer molding, film blowing, fiber spinning, calendaring thermal molding, or foam molding.

The "resin molded article" refers to a pellet or product formed from the resin blend, and the resin molded article may be, but is not particularly limited to, for example, an automobile part, an electronic appliance part, a machine part, a functional film, a toy, or a pipe.

The "layer separation" may refer that a layer substantially formed by one resin is disposed or arranged on a layer substantially formed by different resin. It means that, in the layer formed of substantially one resin, one kind of resin does not form a sea-island structure and is continuously present on an entire surface of one layer. The sea-island structure has a phase-separated resin partially dispersed in an entire resin mixture. In addition, the "substantially formed" may mean that only one resin is present or one resin is rich in one layer.

According to the present application, the resin molded article formed from the resin mixture by a melting process may have an enhanced mechanical and surface characteristics, and reduced production costs and time. For example, the resin blend of the present application may be layer-separated by a melting process, and used to manufacture a resin molded article having a specific function, for example, a high hardness, on a surface without a separate process such as coating and plating.

The layer separation of the resin blend may occur due to a difference in physical properties between the first and second resins and/or polydispersity index of the second resin. Here, the physical properties may be, for example, surface energy, melting viscosity, and solubility parameters. However, in the present application, a blend of two resins is described, but it is obvious to those of ordinary skill in the art that layer separation can be performed by a melting process by blending three or more resins having different physical properties.

According to an exemplary embodiment of the present application, a resin blend including a first resin and a second resin having a difference in surface energy from the first resin at 25° C. of 0.1 to 20 mN/m, and capable of forming a layer-separated structure may be provided.

The difference in surface energy between the first and second resins at 25° C. may be 0.1 to 20 mN/m, 0.5 to 20 mN/m, 1 to 20 mN/m, or 5 to 20 mN/m. When the difference in surface energy is less than 0.1 mN/m, the first and second resins are easily mixed such that the second resin is difficult to be transferred to a surface, and thus a layer separation phenomenon is difficult to occur. In addition, when the difference in surface energy is more than 20 mN/m, the first and second resins may not be bound to each other to be separated or peeled.

The upper and/or lower limit(s) of the difference in surface energy may be an optional value in the range from 0.1 to 20 mN/m, and may be dependent on physical properties of the first resin. Particularly, when the first resin is used as a base resin and the second resin is used as a functional resin to enhance a surface characteristic of the first resin, the second resin may be selected to have a difference in surface energy between the first and second resins at 25° C. of 0.1 to 20 mN/m. In one example, the difference in surface energy may be selected in consideration of hydrophobicity of the second resin in the melt blend of the first and second resins.

The resin blend of the first and second resins having the difference in surface energy at 25° C. of 0.1 to 20 mN/m may be subjected to layer separation through a melting process. In one example, when the resin blend of the first and second resins is melted and exposed to the air, the first and second resins may be separated due to a hydrophobic difference. Particularly, since the second resin having a lower surface energy than the first resin has high hydrophobicity, the second resin is transferred to be in contact with the air, thereby forming a second resin layer toward the air. In addition, the first resin may be in contact with the second resin and disposed to an opposite side of the air. Accordingly, the layer separation between the first and second resins of the resin blend may occur.

As one example of the present application, the second resin may include a hydrophobic moiety at a main chain. As the hydrophobic moiety is included at the main chain of the second resin, the difference in surface energy from the first resin may be more increased, and layer separation efficiency may also be increased.

The hydrophobic moiety may be represented by, for example, Formula 1.

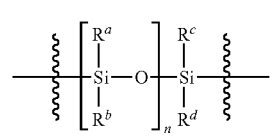

[Formula 1]

In Formula 1, $R^a$ to $R^d$ are each independently an alkyl group having 1 to 16 carbon atoms, and n is a number of 1 to 100.

The alkyl group may be, but is not limited to, a linear or branched alkyl group having 1 to 16, 1 to 12, 1 to 6, or 1 to 4 carbon atoms.

The n may be controlled by a sum of the numbers of the carbon atoms of $R^a$ to $R^d$. For example, when the sum of the numbers of the carbon atoms of $R^a$ to $R^d$ are large, n may be controlled to a small number, and when the sum of the numbers of the carbon atoms of $R^a$ to $R^d$ are small, n may be controlled to a large number. For example, when $R^a$ to $R^d$ are all methyl groups, n may be in the range from 1 to 100, 5 to 80, 10 to 60, 15 to 40, or 15 to 30. However, the value of n may be controlled to have a value corresponding to the carbon number of the substituent when the $R^a$ to $R^d$ are different substituents, other than the methyl group.

In addition, the n may be, for example, an integer or fraction. In one example, when the n is represented as an integer, it may refer to a value of Formula 1 of one kind of molecule included in the second resin. In one example, when the n is represented as a fraction, it may refer to an average value of Formula 1 of two or more kinds of molecules included in the second resin.

While the hydrophobic moiety represented by Formula 1 provides hydrophobicity to the second resin, the second resin may be included, for example, in such a content that layer separation occurs when melted with the first resin. Though the hydrophobic moiety represented by Formula 1 is included in a low content at the main chain of the second resin, high hydrophobicity may be provided to the second resin. For example, the content of the hydrophobic moiety represented by Formula 1 may be controlled to be included at 0.01 to 15 parts by weight, 0.01 to 10 parts by weight, 0.01 to 5 parts by weight, 0.1 to 15 parts by weight, 0.1 to 10 parts by weight, 0.1 to 5 parts by weight, or 0.5 to 4 parts by weight with respect to 100 parts by weight of the second resin. In such a range, the second resin may be easily separated from the first resin during the melting process, and a high hardness surface layer may be formed on a surface of the first resin.

The hydrophobic moiety represented by Formula 1 may be, for example, introduced to the main chain of the second resin using a monomer represented by Formula 2.

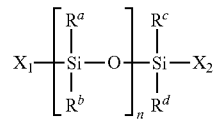

[Formula 2]

In Formula 2, $R^a$ to $R^d$ are each independently an alkyl group having 1 to 16 carbon atoms, and n is a number of 1 to 100. In addition, $X_1$ and $X_2$ are hydrogen, an alkyl group having 1 to 16 carbon atoms, or a mercapto (—SH) group, but at least one of $X_1$ and $X_2$ is a mercapto group. Here, the alkyl group and n are shown in Formula 1.

In one example, a weight average molecular weight of the monomer represented by Formula 2 may be approximately 200 to 10000, 300 to 9000, 400 to 8000, 500 to 7000, 600 to 6000, 700 to 5000, 800 to 4000, 900 to 3000, or 1000 to 2500. Accordingly, n of Formula 1 or 2 may be suitably controlled in consideration of that of the monomer represented by Formula 2.

The monomer represented by Formula 2 may be, for example, dithiol-terminated polydimethylsiloxane or monothiol-terminated polydimethylsiloxane.

The resin blend may be separated into at least two layers. In one example, the resin blend of the first and second resins may be separated into three layers, for example, as shown in FIG. 3, a second resin layer/a first resin layer/a second resin layer when two facing surfaces of the melted resin blend are exposed to the air. Meanwhile, when only one surface of the melted resin blend is exposed to the air, the resin blend may be separated into two layers, for example, a second resin layer/a first resin layer. In addition, when a resin blend including first, second, and third resins having difference in surface energy is melted, the melted resin blend may be separated into five layers, for example, as shown in FIG. 4, a third resin layer/a second resin layer/a first resin layer/a second resin layer/a third resin layer. In addition, when all of the surfaces of the melted resin blend are exposed to the air, the resin blend is layer-separated in all directions, thereby forming a core-shell structure as shown in FIG. 5.

According to another exemplary embodiment of the present application, a resin blend including a first resin and a second resin having a difference in melt viscosity from the first resin of 0.1 to 3000 pa*s at a shear rate of 100 to 1000 s$^{-1}$ and a processing temperature of the resin blend may be provided.

The difference in melt viscosity between the first and second resins may be 0.1 to 3000 pa*s, 1 to 2000 pa*s, 1 to 1000 pa*s, 1 to 600 pa*s, 50 to 600 pa*s, 100 to 600 pa*s, 200 to 600 pa*s, or 250 to 550 pa*s at a shear rate of 100 to 1000 s$^{-1}$ and a processing temperature of the resin blend. When the difference in melt viscosity is smaller than 0.1 pa*s, the first resin and the second resin are easily mixed and thus it is difficult to be easily layer-separated, and when the difference in melt viscosity is larger than 3000 pa*s, the first resin and the second resin may not be bound but may be peeled.

The upper limit and/or lower limit(s) of the difference in melt viscosity may be an optional value in the range from 0.1 to 3000 pa*s, and dependent on physical properties of the first resin. Particularly, when the first resin is used as a base resin and the second resin is used as a functional resin to enhance the surface characteristic of the first resin, the second resin may be selected to have the difference in melt viscosity between the first and second resins of 0.1 to 3000 pa*s at a shear rate of 100 to 1000 s$^{-1}$ and a processing temperature of the resin blend. As an example, the difference in melt viscosity may be selected in consideration of flowability of the second resin in the melt blend of the first and second resins.

The resin blend of the first and second resins having the difference in melt viscosity of 0.1 to 3000 pa*s at a shear rate of 100 to 1000 s$^{-1}$ and a processing temperature of the resin blend may be separated into layers due to the difference in melt viscosity after the melting process. As an example, when the resin blend of the first and second resins is melted and exposed to the air, the first and second resins may be separated due to the difference in flowability. Particularly, since the second resin having a lower melt viscosity than the first resin has high flowability, it may be transferred to be in contact with the air, thereby forming a second resin layer disposed toward the air. In addition, the first resin may be placed to an opposite side of the air while in contact with the second resin. Accordingly, the layer separation may occur between the first and second resins of the resin blend.

As an example of the present application, the second resin may include a bulky organic functional group having a predetermined volume or more. As a specific bulky organic functional group is introduced, the second resin may be increased in hydrodynamic volume, thereby having a lower melt viscosity. Accordingly, in the resin to which the bulky organic functional group is introduced, the above-described layer separation phenomenon may more easily occur in the melting process. A specific example of the bulky organic functional group may be an alkyl group having 2 to 20, 2 to 12, 2 to 6, 3 to 20, 3 to 12, or 3 to 6 carbon atoms, an alicyclic ring having 5 to 40, 5 to 25, or 5 to 16 carbon atoms, and an aromatic ring having 6 to 40, 6 to 25, or 6 to 16 carbon atoms. While there is no particular limitation to a functional group having a fluid dynamic volume, at least one such an organic functional group may be included in the second resin.

Specifically, the bulky organic functional group may be, for example, an aliphatic functional group such as tertiary butyl, isobutyl, or isopropyl, an alicyclic ring functional group such as isobornyl or cyclohexyl, or an aromatic ring functional group such as naphthyl, phenyl, anthracenyl, or benzyl.

The melt viscosity may be measured by capillary flow, which means a shear viscosity (pa*s) according to specific processing temperature and shear rate (/s).

The "shear rate" refers to a shear rate applied when the resin blend is processed, and the shear rate may be controlled between 100 to 1000 s$^{-1}$ according to a processing method. The control of the shear rate according to the processing method is obvious to those of ordinary skill in the art.

The "processing temperature" means a temperature at which the resin blend is processed. For example, it means a temperature applied to the melting process when the resin blend is used in a melting process such extrusion or injection. The processing temperature may be controlled depending on a resin applied to the melting process such as extrusion or injection. For example, when the resin blend including a first resin of an ABS resin and a second resin obtained from a methylmethacrylate-based monomer is used, a processing temperature may be 210 to 240° C.

According to still another exemplary embodiment of the present application, a resin blend for forming a layer-separated structure, which includes a first resin and a second resin having a difference in solubility parameter from the first resin of 0.001 to 10.0 (J/cm$^3$)$^{1/2}$ may be provided.

The difference in solubility parameter between the first and second resins may be 0.001 to 10.0 (J/cm$^3$)$^{1/2}$, 0.01 to 5.0 (J/cm$^3$)$^{1/2}$, 0.01 to 3.0 (J/cm$^3$)$^{1/2}$, 0.01 to 2.0 (J/cm$^3$)$^{1/2}$, 0.1 to 1.0 (J/cm$^3$)$^{1/2}$, 0.1 to 10.0 (J/cm$^3$)$^{1/2}$, 3.0 to 10.0 (J/cm$^3$)$^{1/2}$, 5.0 to 10.0 (J/cm$^3$)$^{1/2}$, or 3.0 to 8.0 (J/cm$^3$)$^{1/2}$ at 25° C. Such a solubility parameter is an original characteristic of a resin exhibiting solubility according to polarity of each resin molecule, and the solubility parameter with respect to each resin is generally known. When the difference in solubility parameter is smaller than 0.001 (J/cm$^3$)$^{1/2}$, the first resin is easily mixed with the second resin, and thus the layer separation is difficult to occur, and when the difference in solubility parameter is larger than 10.0 (J/cm$^3$)$^{1/2}$, the first and second resins may not be bound but may be peeled.

The upper limit and/or lower limit(s) of the difference in solubility parameter may be an optional value within the range of 0.001 to 10.0 $(J/cm^3)^{1/2}$, and dependent on the physical properties of the first resin. Particularly, when the first resin is used as a base resin and the second resin is used as a functional resin to enhance a surface characteristic of the first resin, the second resin may be selected to have the difference in solubility parameter between the first and second resins at 25° C. of 0.001 to 10.0 $(J/cm^3)^{1/2}$. In one example, the difference in solubility parameter may be selected in consideration of miscibility of the second resin in the melt blend of the first and second resins.

The resin blend of the first and second resins having the difference in solubility parameter at 25° C. of 0.001 to 10.0 $(J/cm^3)^{1/2}$ may be subjected to layer separation through a melting process. In one example, when the resin blend of the first and second resins is melted and exposed to the air, the first and second resins may be separated due to a degree of the miscibility. Particularly, the second resin having the difference in solubility parameter at 25° C. of 0.001 to 10 $(J/cm^3)^{1/2}$ with respect to the first resin may not be mixed with the first resin. Therefore, when the second resin additionally has a lower surface tension or melt viscosity than the first resin, the second resin may be transferred to be in contact with the air, thereby forming a second resin layer disposed toward the air. In addition, the first resin may be in contact with the second resin and disposed to an opposite side of the air. Accordingly, the layer separation may occur between the first and second resins of the resin blend.

According to yet another exemplary embodiment of the present application, a PDI of the second resin may be 1 to 2.5, 1.3 to 2.5, 1.5 to 2.5, or 1.7 to 2.5. The upper and lower limits of the PDI of the second resin may be optional values of 1 to 2.5.

When the PDI of the second resin is higher than 2.5, the first resin and the second resin may be easily mixed due to a low molecular weight, or the flowability of the second resin may be reduced due to a high molecular weight, resulting in difficulty in layer separation.

According to yet another exemplary embodiment of the present application, a weight average molecular weight (Mw) of the second resin of the resin blend may be 30,000 to 200,000, 50,000 to 200,000, 80,000 to 200,000, 50,000 to 150,000, 80,000 to 150,000, 50,000 to 120,000, or 80,000 to 120,000. The upper and lower limits of the weight average molecular weight of the second resin may be optional values ranging from 30,000 to 200,000.

When the weight average molecular weight is less than 30,000, the first and second resins are easily mixed, and when the weight average molecular weight is more than 200,000, the flowability of the second resin is reduced, and thus the layer separation is difficult to occur.

In addition, according to yet another exemplary embodiment of the present application, the second resin may have a higher glass transition temperature (Tg) than the first resin, and a difference in glass transition temperature between the first and second resins may be 10, 20, or 23° C. or more. The maximum value of the difference in glass transition temperature between the first and second resins may be, but is not particularly limited to, 150° C. or less.

When the glass transition temperature of the second resin is higher than 10° C. or more than the first resin, the second resin having a high glass transition temperature is disposed to an outer side of a resin molded article, thereby considerably enhancing a surface hardness.

Particularly, as an example of the present application, when the second resin includes hydrogen-binding donor and acceptor, the second resin may have a high glass transition temperature, and thus a surface hardness of the final molded product may be further increased.

In the specification, as the hydrogen-binding donor, a functional group or residue including an N- or O-binding hydrogen may be used without particular limitation, and for example, may be a OH group, an $NH_2$ group, an NHR group, a COOH group, a $CONH_2$ group, an NHOH group, or a residue of an NHCO bond, an NH bond, a CONHCO bond, or an NH—NH bond in a molecule.

In addition, in the specification, the hydrogen-binding acceptor may be, an N- or O-containing functional group or residue without particular limitation, for example, an OH group, an OR group, an $NH_2$ group, an NHR group, an $NR_2$ group, a COOH group, a COOR group, a $CONH_2$ group, a $CONR_2$ group, an NHOH group, an NROR group, or a residue of an NHCO bond, an NRCO bond, an O bond, an NH bond, an NR bond, a COO bond, a CONHCO bond, a CONRCO bond, an NH—NH bond, an NR—NH bond, or an NR—NR bond in a molecule. Here, R may be an aliphatic hydrocarbon, an aromatic hydrocarbon, and a derivative thereof, for example, an aliphatic hydrocarbon having 1 to 16 or 1 to 9 carbon atoms, an aromatic hydrocarbon having 5 to 30 or 5 to 16 carbon atoms and a derivative thereof. Not particularly limited to a theory, most of the hydrogen-binding donors may serve as hydrogen-binding acceptors. The hydrogen-binding donor provides a hydrogen binding to an atom having a large electronegativity, and meanwhile, a part of the atom having a large electronegativity may also serve as a hydrogen-biding acceptor. However, like a $—(NH_4)^+$ group, a functional group only serving as a hydrogen-binding donor is also present.

The increase in glass transition temperature of the second resin may be shown when the second resin includes both of the hydrogen-binding donor and acceptor.

In one example, the hydrogen-binding donor and acceptor may be present in one kind of resin. One kind of the resin including the hydrogen-binding donor and acceptor may be obtained by polymerizing a resin from a monomer including both of the hydrogen-binding donor and acceptor, or a resin from a monomer including a hydrogen-binding donor and a monomer including a hydrogen-binding acceptor. Here, one or at least two kinds of monomers may be used.

In another example, the hydrogen-binding donor and acceptor may be present in a different kind of resins. That is, a resin polymerized from a monomer including the hydrogen-binding donor may be blended with a resin polymerized from a monomer including the hydrogen-binding acceptor, and included in the second resin. Here, at least one or two or more kinds of monomers may be used. In addition, in the second resin, when the hydrogen-binding donor and acceptor are present as one or two or more kinds of resins, a resin not including a hydrogen-binding donor and/or acceptor may be further included.

A monomer capable of providing a hydrogen-binding donor and/or acceptor to the second resin may include at least one functional group or residue of the hydrogen-binding donor and/or acceptor, for example, at least two or three functional groups or residues.

The monomer including the hydrogen-binding donor and/or acceptor may be, but is not particularly limited to, a vinylether such as methyl vinylether or ethyl vinylether; a nitrogen-containing monomer such as (meth)acrylamide, N-substituted (meth)acrylamide, or N,N-substituted (meth) acrylamide; vinyl acetate; a hydroxyl group-containing monomer such as hydroxyalkyl(meth)acrylate; a carboxyl group-containing monomer such as (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid, or a maleic acid anhydride; or a hetero cyclic compound such as vinyl pyrrolidone, acryloyl morpholine, or a 2-ureido-4-pyrimidinone-containing monomer.

Meanwhile, the first resin is a resin mainly determining physical properties of a desired molded product, and may be selected according to a kind of a desired molded product and a process condition. As such a first resin, a general synthetic resin may be, but is not limited to, for example, a styrene-based resin such as an acrylonitrile butadiene styrene (ABS)-based resin, a polystyrene-based resin, an acrylonitrile styrene acrylate (ASA)-based resin, or a styrene-butadiene-styrene block copolymer-based resin; a polyolefin-based resin such as a high-density polyethylene-based resin, a low-density polyethylene-based resin, or a polypropylene-based resin; a thermoplastic elastomer such as an ester-based thermoplastic elastomer or an olefin-based thermoplastic elastomer; a polyoxyalkylene-based resin such as a polyoxymethylene-based resin or a polyoxyethylene-based resin; a polyester-based resin such as a polyethylene terephthalate-based resin or a polybutylene terephthalate-based resin; a polyvinylchloride-based resin; a polycarbonate-based resin; a polyphenylenesulfide-based resin; a vinylalcohol-based resin; a polyamide-based resin; an acrylate-based resin; an engineering plastic; a copolymer thereof, or a mixture thereof. The engineering plastic is a plastic exhibiting excellent mechanical and thermal properties. For example, polyetherketone, polysulfone, and polyimide may be used as the engineering plastic. In one example, as the first resin, a copolymer of a styrene-based resin and an acrylate-based resin may be used.

The second resin refers to a resin having a difference in the above-described physical properties from the first resin, and capable of providing excellent mechanical characteristics and a higher surface hardness to a surface of the desired molded product.

In one example, the second resin may be, as described above, a polymer including a monomer represented by Formula 2 as a polymerization unit. For example, the monomer represented by Formula 2 may be included in the second resin while copolymerized with another monomer. A specific kind of the resin included in the second resin may be, but is not particularly limited to, for example, a (meth)acrylate-based resin, an epoxy-based resin, an oxetane-based resin, an isocyanate-based resin, a fluorine-based resin, or a copolymer thereof.

In one example, when the (meth)acrylate-based resin is included in the second resin, the monomer represented by Formula 2 may be included in the second resin while polymerized with a (meth)acrylic monomer. Such a (meth)acrylic monomer may be, but is not limited to, for example, an alkyl(meth)acrylate such as methyl(meth)acrylate, ethyl(meth)acrylate, propyl(meth)acrylate, butyl(meth)acrylate, cyclohexyl(meth)acrylate, octyl(meth)acrylate, lauryl(meth)acrylate, or stearyl(meth)acrylate; or glycidyl(meth)acrylate.

In another example, when the epoxy-based resin is included in the second resin, the monomer represented by Formula 2 may be included in the second resin while polymerized with a monomer for providing an epoxy-based resin. The epoxy-based resin may be, but is not limited to, a bisphenol-type such as a bisphenol A-type, a bisphenol F-type, a bisphenol S-type, and a hydrogenated product thereof; a novolac-type such as a phenolnovolac-type or a cresol novolac-type; a nitrogen-containing ring-type such as a triglycidylisocyanurate-type or a hydantoin-type; an alicyclic-type; an aliphatic-type; an aromatic-type such as a naphthalene-type or a biphenyl-type; a glycidyl-type such as a glycidylether-type, a glycidylamine-type, or a glycidylester-type; a dicyclo-type such as a dicyclopentadiene-type; an ester-type; or an etherester-type.

In still another example, when an oxetane-based resin is included in the second resin, the monomer represented by Formula 2 may be included in the second resin while polymerized with an oxetane monomer having at least one oxetane ring. Such an oxetane monomer may be, but is not limited to, for example, 1,4-bis[(3-ethyl-3-oxetanyl-methoxy)methyl]benzene, di[1-ethyl(3-oxetanyl)]methylether, phenolnovolac oxetane, terephthalate bisoxetane, or biphenylene bisoxetane.

In addition, in yet another example, when an isocyanate-based resin is included in the second resin, the monomer represented by Formula 2 may be included in the second resin while polymerized with a monomer containing an isocyanate group. As such a monomer containing an isocyanate group, for example, diphenyldiisocyanate (MDI), toluenediisocyanate (TDI), or isophoronediisocyanate (IPDI) may be used, but the present application is not limited thereto.

In addition, in yet another example, when a fluorine-based resin is included in the second resin, the monomer represented by Formula 2 may be included in the second resin while polymerized with a fluorine-based monomer. As such a fluorine-based monomer, for example, tetrafluoroethylene, chlorotrifluoroethylene, fluorinated vinylidene, or fluorinated vinyl may be used, but the present application is not limited thereto.

A content of the monomer represented by Formula 2 may be suitably controlled in the range capable of providing hydrophobicity to the second resin and enabling the layer separation with the first resin. In one example, the content of the monomer represented by Formula 2 may be controlled in the range from 0.01 to 15 parts by weight, 0.01 to 10 parts by weight, 0.01 to 5 parts by weight, 0.1 to 15 parts by weight, 0.1 to 10 parts by weight, 0.1 to 5 parts by weight, or 0.5 to 4 parts by weight with respect to 100 parts by weight of the total monomer to polymerize the second resin.

The expression "a (meth)acrylate-, epoxy-, oxetane-, isocyanate-, or fluorine-based resin or a copolymer thereof is used as the second resin" means that the above-described resin is used as a major resin of the second resin. Accordingly, in one example, as the second resin, a polymer polymerized from a monomer mixture including a monomer capable of providing the major resin and the monomer represented by Formula 2 may be used. In another example, as the second resin, a polymer polymerized from a monomer mixture further including a monomer capable of introducing the bulky organic functional group and/or hydrogen-binding donor and acceptor to a monomer capable of providing the major resin and the monomer represented by Formula 2 may be used.

The monomer capable of introducing the bulky organic functional group may be, for example, tertiary butyl(meth)acrylate, isobutyl(meth)acrylate, isopropyl(meth)acrylate, isobornyl(meth)acrylate, cyclohexyl(meth)acrylate, naphthyl(meth)acrylate, phenyl(meth)acrylate, anthracenyl(meth)acrylate, or benzyl(meth)acrylate.

In addition, as the monomer capable of introducing the hydrogen-binding donor and acceptor, the above-exemplified monomers may be used.

The resin blend may include the second resin at 0.1 to 50 parts by weight, for example, 1 to 20 parts by weight, 1 to 15 parts by weight, or 5 to 15 parts by weight, with respect to 100 parts by weight of the first resin.

When the second resin is included in an amount less than 0.1 parts by weight, with respect to 100 parts by weight of the first resin, a phase separation phenomenon does not occur, and when the second resin is included in an amount more than 50 parts by weight, a preparation cost is increased due to a high cost of the second resin.

The resin blend may be prepared in a pellet by extrusion. The pellet prepared using the resin blend, as shown in FIG. 6, may form a layer in which a first resin is placed in the center, and a second resin is layer-separated from the first resin and disposed at a shell of the pellet.

According to an exemplary embodiment of the present application, a pellet includes a core including a first resin, and a shell including a second resin having a hydrophobic moiety represented by Formula 1 at a main chain and having a difference in surface energy from the first resin at 25° C. of 0.1 to 20 mN/m.

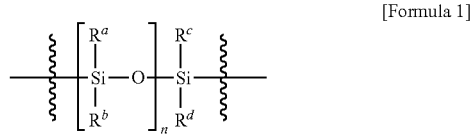

[Formula 1]

In Formula 1, $R^a$ to $R^d$ and n are defined as described above. In addition, as described above, the first and second resins may have different physical properties. For example, the first and second resins may have a difference in surface energy at 25° C. of 0.1 to 20 mN/m, a shear rate of 100 to 1000 $s^{-1}$, a difference in melt viscosity at a processing temperature of the pellet of 0.1 to 3000 pa*s, and a difference in solubility parameter at 25° C. of 0.001 to 10.0 $(J/cm^3)^{1/2}$. In addition, the PDI of the second resin may be 1 to 2.5, and the weight average molecular weight of the second resin may be 30,000 to 200,000. In addition, the second resin may have a higher glass transition temperature than the first resin, and a difference in glass transition temperature between the first and second resins may be 10 to 150° C.

The specific kinds and physical properties of the first and second resins are described above, and thus the detailed description will be omitted.

Meanwhile, according to yet another exemplary embodiment of the present application, a method of manufacturing a resin molded article having a layer-separated structure may be provided. The method may include forming a melt blend by melting a blend of a first resin and a second resin, and forming a layer-separated structure by processing the melt blend.

As described above, due to the difference in physical properties between the first and second resins, the layer separation phenomenon may occur in the process of melting the resin blend, and a surface of the pellet or molded product may be selectively coated without a separate additional process due to such a layer separation phenomenon.

Particularly, the second resin of the present application may have a lower surface energy by introducing a hydrophobic moiety represented by Formula 1 to the main chain to increase layer separation efficiency, and thus a molded product in which the second resin, for example, a high hardness resin, is more easily disposed to a surface and thus a mechanical property and a surface characteristic are enhanced may be provided.

Meanwhile, the melt process may be performed under a shear stress, and may be, but is not limited to, extrusion and/or injection.

According to yet another exemplary embodiment of the present application, the resin blend may be prepared in a pellet by a melt process such as extrusion. For example, as described above, in the resin blend including the first and second resins, since the second resin has higher hydrophobicity than the first resin, the second resin is transferred to be in contact with the air, thereby forming a surface layer of the pellet, and the first resin is disposed in the center of the pellet, thereby forming a core. In addition, the resin blend may be extruded in a pellet, and then the pellet may be manufactured in a molded product by a melt process such as injection. Meanwhile, a molded product may be directly manufactured from the resin blend by a melt process such as injection.

In the melt process of the resin blend, temperatures may be changed according to the kinds of the first and second resins.

In the method of manufacturing the resin molded article, curing a resulting product obtained by melting the resin blend, that is, a melted product of the resin blend may be further included. The curing may be, for example, thermal curing or UV curing. In addition, it is obvious to those of ordinary skill in the art that chemical or physical treatment can be further performed.

Meanwhile, the method of manufacturing the resin molded article may further include preparing a second resin before melting the resin blend. The second resin may be selected according to the first resin as described above, and the selected second resin may provide a specific function, for example, high hardness to a surface layer of the resin molded article. To prepare the second resin, any general method of preparing a resin through polymerization of a monomer may be used, and the method may be, for example, bulk polymerization, solution polymerization, suspension polymerization, or emulsion polymerization.

The preparation of the second resin may include dispersing a monomer capable of providing a monomer capable of introducing the hydrophobic moiety of Formula 1, for example, the monomer represented by Formula 2 and the monomer capable of providing a major resin in a reaction solvent, blending at least one additive selected from the group consisting of a chain transfer agent, an initiator, and a dispersion stabilizer in the reaction solvent, and polymerizing the blend at 40° C. or more.

The reaction medium may be any medium known to be conventionally used to prepare a synthetic resin, a polymer, or a copolymer without limitation. As an example of such a reaction medium, methylethylketone, ethanol, methylisobutylketone, distilled water, or a mixture of at least two thereof may be used.

The chain transfer agent capable of being added to the reaction solvent may be, but is not limited to, an alkyl mercaptan such as n-butyl mercaptan, n-dodecyl mercaptan, tertiary dodecyl mercaptan, or isopropyl mercaptan; an aryl mercaptan such as phenyl mercaptan, naphthyl mercaptan, or benzyl mercaptan; a halogen compound such as carbon tetrachloride; or an aromatic compound such as an α-methylstyrene dimer or an α-ethylstyrene dimer.

The initiator may be a polymerization initiator known to be conventionally used in suspension polymerization, for example, a peroxide such as octanoyl peroxide, decanoyl peroxide, or lauroyl peroxide; or an azo-based compound such as azobisisobutyronitrile or azobis-(2,4-dimethyl)-valeronitrile without particular limitation.

The dispersion stabilizer capable of being included in the reaction medium may be, but is not limited to, an organic dispersing agent such as polyvinylalcohol, polyolefin-maleic acid, cellulose, or an inorganic dispersing agent such as tricalciumphosphate.

Details on the first and second resins, and the hydrophobic moiety are already described, and thus detailed descriptions will be omitted.

Meanwhile, according to yet another exemplary embodiment of the present application, a resin molded article may include a first resin layer; a second resin layer formed on the first resin layer; and an interface layer including first and second resins and formed between the first and second resin layers. Here, the second resin layer includes a second resin having a hydrophobic moiety represented by Formula 1.

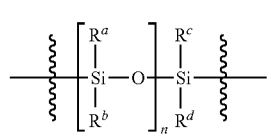

[Formula 1]

In Formula 1, $R^a$ to $R^d$ and n are defined above.

The resin molded article manufactured from a resin blend including a first resin and a second resin having different physical properties and a hydrophobic moiety represented by Formula 1 at a main chain may have, for example, a layer-separated structure in which a first resin layer is disposed inside and a second resin layer is formed on a surface of the resin molded article.

The structure of the resin molded article, that is, the structure in which the first resin layer and the second resin layer are divided by the interface layer, and the second resin layer is exposed to an outside, is not known in the conventional art but new. The structure can exclude a coating or painting process to enhance a surface characteristic, reduce production time and production costs, and increase productivity of the final product. Such a structure may not be formed by extruding or injecting a general resin, and the effects according to the structure are difficult to obtain.

Particularly, as the resin molded article uses the second resin including a hydrophobic moiety represented by Formula 1 at a main chain to increase layer separation efficiency, a surface hardness of the resin molded article may be additionally increased.

The "first resin layer" may mainly include the first resin, may determine physical properties of the molded product, and may be disposed in the resin molded article. In addition, the "second resin layer" may mainly include the second resin, may be disposed to a circumference of the resin molded article, and may provide a specific function to a surface of the molded product.

Details on the first and second resins, and the hydrophobic moiety are already described, and thus the related descriptions will be omitted.

Meanwhile, the resin molded article may include an interface layer formed between the first and second resin layers and including a mixture of the first and second resins. The interface layer may be formed between the separated first and second resin layers to serve as a boundary surface, and include the mixture of the first and second resins. The mixture may have the first and second resins physically or chemically bound, and the first and second resin layers may be bound through such a mixture.

As described above, the resin molded article may include a structure in which the first and second resin layers are divided by such an interface layer, and the second resin layer is exposed to the outside. For example, the molded product may have a structure in which the first resin layer, the interface layer, and the second resin layer are sequentially stacked, and a structure in which the interface and the second resin are stacked to upper and lower sides of the first resin. In addition, the resin molded article may include a structure in which the first resin layer having various stereoscopic types, for example, spherical, circular, polygonal, or sheet types is sequentially surrounded by the interface and the second resin layer.

The layer separation phenomenon shown in the resin molded article is caused by manufacturing the resin molded article by applying specific first and second resins having different physical properties. Such different physical properties include surface energy, melt viscosity, and solubility parameters. Details on the difference in physical properties are described above.

Meanwhile, the first and second resin layers and the interface layer of a sample may be subjected to a low temperature impact test, and a fracture surface of the sample may be etched using THF vapor, and confirmed using SEM. The measurement of a thickness of each layer includes forming a smooth cross-section by cutting the sample with a diamond knife using microtoming equipment, and etching the smooth cross-section using a solution capable of more selectively dissolving the second resin than the first resin. The etched cross-sections vary in melted degree according to the contents of the first and second resins, and when the cross-section is seen at 45 degrees above a surface using SEM, the first and second resin layers, the interface layer, and the surface may be observed by the difference in shades, and thus the thickness of each layer may be measured. In the present application, as a solution selectively more easily dissolving the second resin, a 1,2-dichloroethane solution (10 vol %, in EtOH) is used, but any solution having a higher solubility of the second resin than the first resin is not particularly limited, and may be suitably selected according to the kind and composition of the second resin by one of ordinary skill in the art.

The interface layer may have a thickness of 0.01 to 95%, 0.1 to 70%, 0.1 to 50%, 5 to 50%, 10 to 50%, 15 to 50%, or 20 to 50% with respect to a total thickness of the second resin layer and the interface layer. When the interface layer has a thickness of 0.01 to 95% of the total thickness of the second resin layer and the interface layer, due to an excellent interface binding strength between the first and second resin layers, the both layers may not be peeled, and surface characteristics caused by the second resin layer may be considerably enhanced. On the other hand, when the interface layer is too much thinner than the second resin layer, due to a decreased binding strength between the first and second resin layers, the both layers may be peeled, and when the interface layer is too thick, an effect of the enhancement in surface characteristics caused by the second resin layer may be insignificant.

The second resin layer may have a thickness of 0.01 to 60%, 0.01 to 40%, 0.01 to 20%, 0.01 to 10%, 0.01 to 5% 0.01 to 3%, or 0.1 to 3% with respect to the total resin molded article. As the second resin layer has a thickness in a certain range, the enhanced surface hardness or scratch resistance may be provided to a surface of the molded product. When the thickness of the second resin layer is too small, it is difficult to sufficiently enhance the surface characteristic of the molded product, and when the thickness of the second resin layer is too large, mechanical properties of the first resin may be changed by reflecting mechanical properties of a functional resin itself to the resin molded article.

Details on the first and second resins, difference in physical properties between the first and second resins, and the hydrophobic moiety included in the second resin are already described, and related descriptions will be omitted.

Meanwhile, according to yet another exemplary embodiment of the present application, a resin molded article including a first resin layer and a second resin layer formed on the first resin layer may be provided. A first resin layer component is detected on a surface of the second resin layer by an IR spectrophotometer (IR), and the second resin layer includes a second resin having a hydrophobic moiety represented by Formula 1 at a main chain.

The structure of the molded product, that is, the structure in which the first resin layer component is detected on a surface of the second resin layer by an IR spectrophotometer is not known in the conventional art, but new, and generally, in a coating process, it is difficult to detect the first resin layer component on the surface of the second resin layer.

Here, the surface of the second resin layer refers to a surface exposed to an outside (e.g., the air), not to the first resin layer.

Details on the first and second resins, the difference in physical properties between the first and second resins, and the hydrophobic moiety included in the second resin are already described, and related descriptions will be omitted.

In addition, in the specification, the difference in physical properties between the first and second resins may refer to the difference in physical properties between the first and second resins or between the first and second resin layers.

In addition, according to yet another exemplary embodiment of the present application, an automobile part, a helmet, an electric appliance part, a spinning machine part, a toy, or a pipe including the resin molded article may be provided.

Advantageous Effects

According to the present application, a resin blend which can enhance mechanical properties and surface hardness of a molded product, and exhibit effects of reduction of a processing time, increase in productivity, and reduction of production costs without using an additional surface coating, a pellet, a method of manufacturing a resin molded article using the same, and a resin molded article manufactured thereby can be provided.

MODES OF INVENTION

Figure 1:
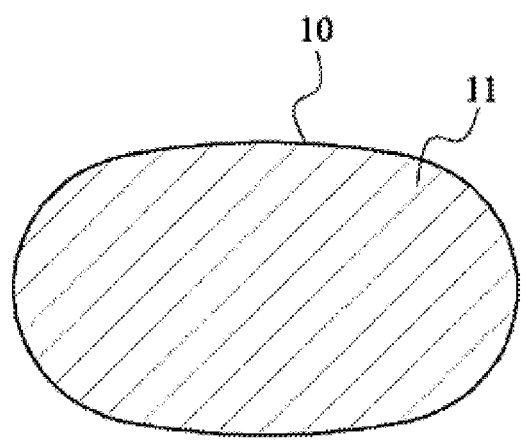
FIG. 1 is a schematic diagram of a resin blend as an example of the present application.
Figure 2:
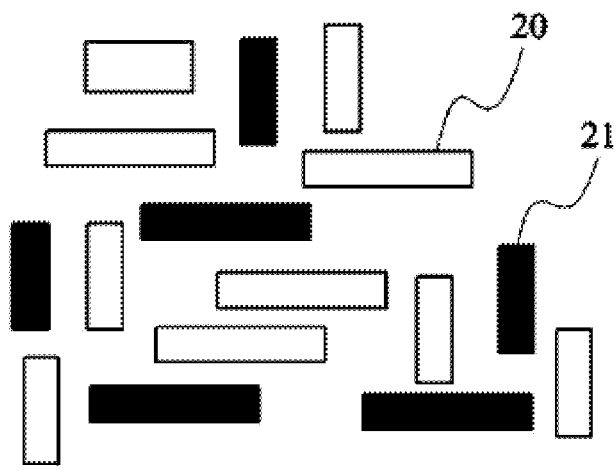
FIG. 2 is a schematic diagram of a resin blend as another example of the present application.
Figure 3:
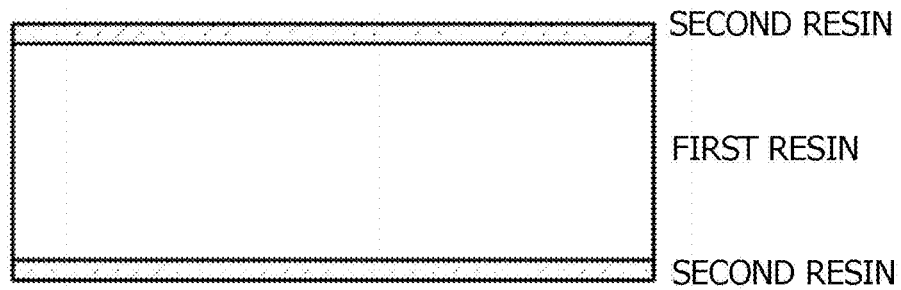
FIG. 3 is a schematic diagram of a layer-separated structure formed of a resin blend including a first resin and a second resin as an example of the present application.
Figure 4:
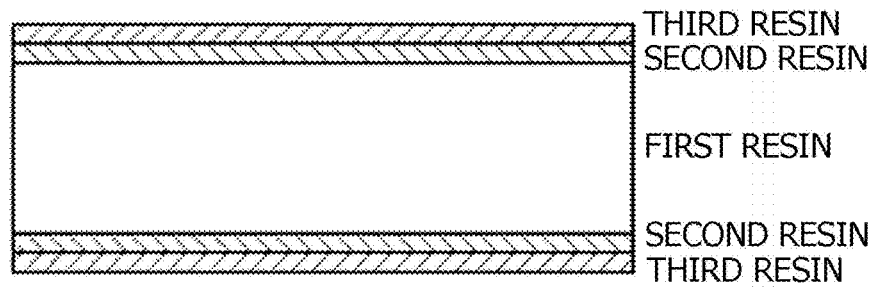
FIG. 4 is a schematic diagram of a layer-separated structure formed of a resin blend including a first resin, a second resin, and a third resin as an example of the present application.
Figure 5:
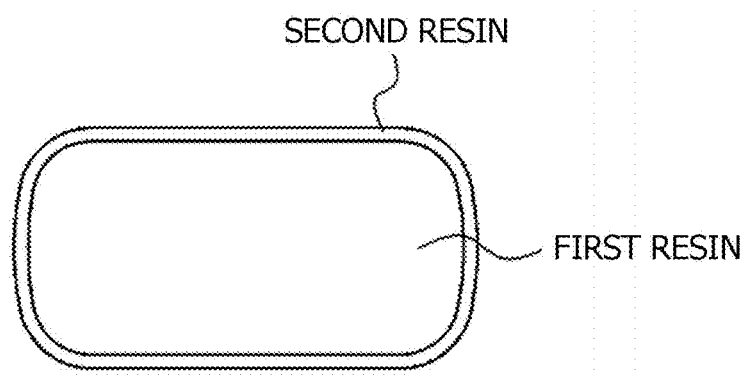
FIG. 5 is a schematic diagram of a layer-separated structure as another aspect of the present application.
Figure 6:
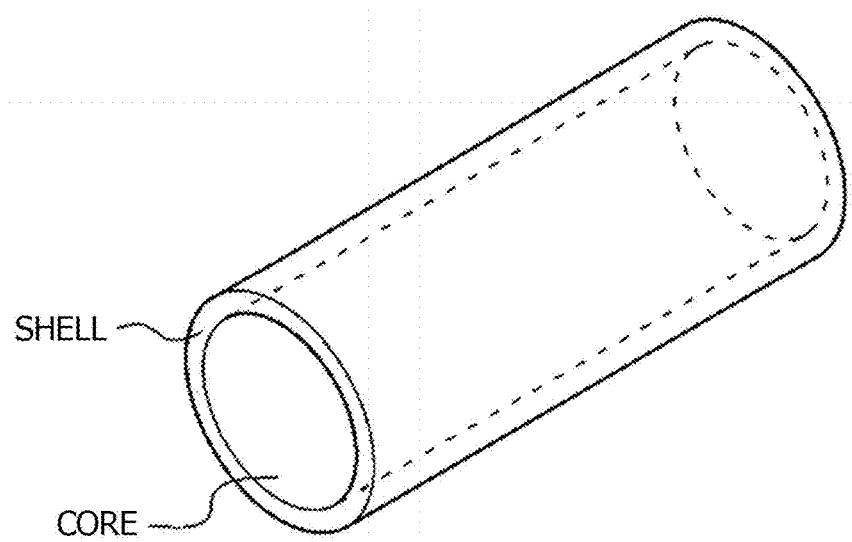
FIG. 6 is a schematic diagram of a pellet having a core and a shell.
Figure 7:
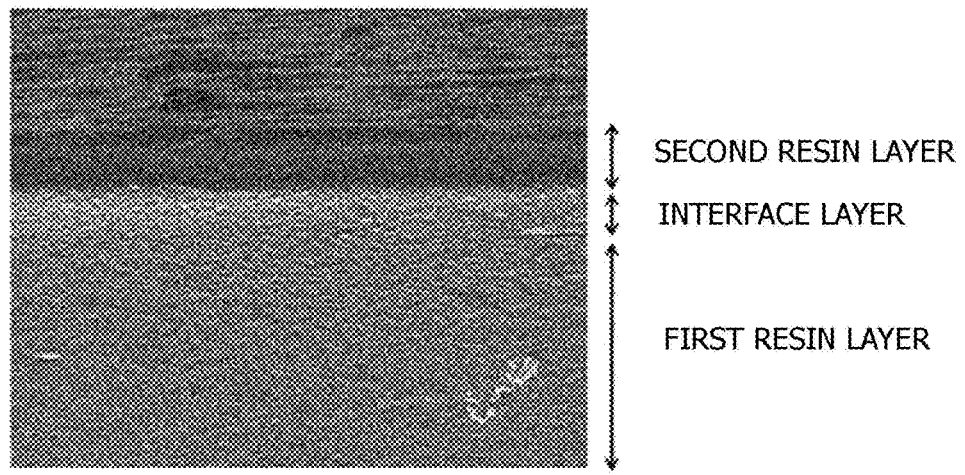
FIG. 7 is an SEM image of a layer-separated cross-section of a molded product manufactured in Example 3.
Figure 8:
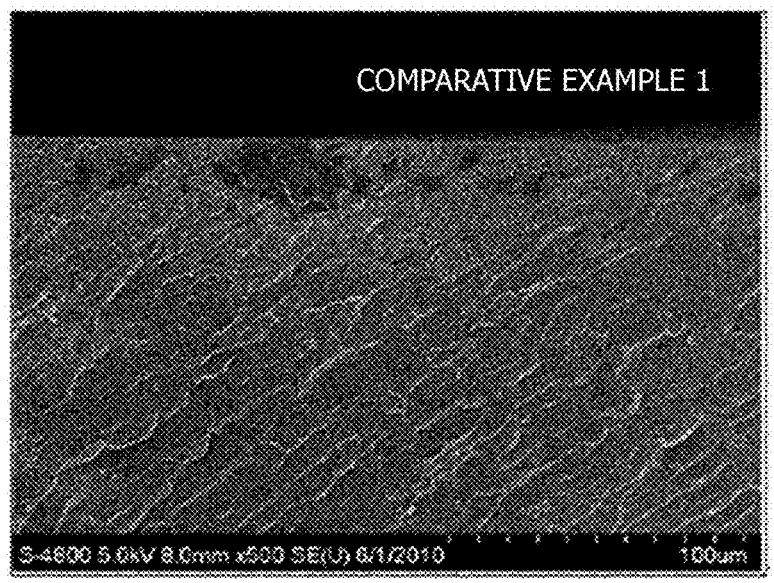
FIG. 8 is an SEM image of a cross-section of a molded product manufactured in Comparative Example 1.

The present application will be described in further detail with respect to Examples. Though the following Examples are merely provided to exemplify the present application, the scope of the present application is not limited to the following Examples.

Measurement of Glass Transition Temperature

A glass transition temperature was measured using a differential scanning calorimeter (DSC823e, Mettler-toledo). More specifically, an aluminum pan containing 1 mg of a first resin sample or a second resin sample is equipped to a measuring device, and a glass transition temperature was measured at −50 to 300° C. (10° C./min, 2 cycles).

Measurement of Surface Energy

According to the Owens-Wendt-Rabel-Kaelble method, a surface energy was measured using a drop shape analyzer (DSA100, KRUSS).

More specifically, the first or second resin was dissolved at 10 wt % in a blending solution of methyl ethyl ketone and methyl isobutyl ketone (2:1), and bar-coated on a triacetylcellulose (TAC) film. In addition, the coated TAC film was dried in an oven at 90° C. for 5 minutes.

After drying (or curing), deionized water and diiodomethane were dropped 10 times on the coated surface, and contact angles were averaged. The average value was assigned to the Owens-Wendt-Rabel-Kaelble method, thereby obtaining a surface energy.

Measurement of Melt Viscosity

A melt viscosity was measured using a capillary rheometer 1501 (Gottfert).

More specifically, after a capillary die was attached to a barrel, the first or second resin was poured to fill three times. In addition, a shear viscosity (pa*s) was measured at a shear rate of 100 to 1000 $s^{-1}$ and a processing temperature of 240° C.

Measurement of Polydispersity Index (PDI) and Weight Average Molecular Weight (Mw)

Polydispersity index was measured by gel permeation chromatography (GPC), and conditions are as follows.

Device: 1200 series, Agilent Technologies
Column: two PLgel mixed Bs, Polymer Laboratories
Solvent: THF
Column temperature: 40° C.
Sample concentration: 1 mg/mL, 100 L injection
Standard: polystyrene (Mp: 3900000, 723000, 316500, 52200, 31400, 7200, 3940, 485)

As an analysis program, a ChemStation (Agilent Technologies) was used, and a weight average molecular weight (Mw) and a number average molecular weight (Mn) were measured by GPC, thereby calculating a polydispersity index (PDI) from weight average molecular weight/number average molecular weight (Mw/Mn).

Observation of Cross-Section

Samples of Examples and Comparative Examples were subjected to a low temperature impact test, a fracture surface of each sample was etched using THF vapor, and then a layer-separated cross-section was observed using SEM. Meanwhile, to measure thicknesses of a first resin layer, a second resin layer, and an interface layer, which are layer-separated, the samples of Examples and Comparative Examples were cut with a diamond knife using a microtoming device (Leica EM FC6) at −120° C. to obtain a smooth cross-section. A cross-section part of the sample including the smooth cross-section was immersed in a 1,2-dichloroethane solution (10 vol %, in EtOH) to etch for 10 seconds, and then cleaned with distilled water. The etched parts of the cross-sections varied according to contents of the first and second resins, and were observed using SEM. That is, the first and second resin layers and the interface layer could be observed according to a difference in shades when the cross-section was seen at 45 degrees above a surface, and each thickness could be measured.

Test for Measuring Pencil Hardness

Pencil hardness of surfaces of the samples of Examples and Comparative Examples were measured using a pencil harness tester (Chungbuk Tech) under a constant load of 500 g. The surface was scratched at 45 degrees while a standard pencil (Mitsubishi) was changed to 9H from 6B to observe surface variation (ASTM 3363-74). The measurement results are average values obtained from tests repeatedly performed five times.

Test for Measuring Strength

Strengths of the samples of Examples and Comparative Examples were measured according to ASTM D256. Specifically, an energy (Kg*cm/cm) required to destroy a V-shape notched sample by facing the striking edge of a pendulum was measured using an impact tester (Impact 104, Tinius Olsen). The measurement was performed on ⅛" and ¼" samples five times each, and an average value was obtained.

Surface Analysis by IR Spectrophotometer

The analysis was performed using an UMA-600 IR microscope equipped with a Varian FTS-7000 spectrophotometer (Varian, USA) and a mercury cadmium telluride (MCT) detector, spectrum measurement and data processing were performed using a Win-IR PRO 3.4 software (Varian, USA), and conditions are as follows.

Germanium (Ge) ATR crystal having a refractive index of 4.0

Scan with a middle infrared spectrum from 4000 $cm^{-1}$ to 600 $cm^{-1}$ at spectral resolution of 8 $cm^{-1}$ through attenuated total reflection (ATR)

Internal reference band: carbonyl group of acrylate (C=O str., ~1725 $cm^{-1}$)

Proper component of first resin: butadiene compound [C=C str. (~1630 $cm^{-1}$) or =C—H out-of-plane vib. (~970 $cm^{-1}$)]

Peak strength ratios [$I_{BD}$(C=C)/$I_A$(C=O)] and [$I_{BD}$(out-of-plane)/$I_A$(C=O)] were calculated, and spectrum measurement was repeated five times on a different region in one sample, thereby calculating average values and standard deviations.

EXAMPLE 1

(1) Preparation of First and Second Resins and Measurement of Physical Properties As a first resin, a thermoplastic resin composed of 60 wt % of methylmethacrylate, 7 wt % of acrylonitrile, 10 wt % of butadiene, and 23 wt % of styrene was used. To prepare a second resin, 1500 g of distilled water and 4 g of a 2% polyvinylalcohol aqueous solution as a dispersing agent were input into a 3 liter reactor to dissolve. Subsequently, 792 g of methylmethacrylate, 8 g of dithiol-terminated polydimethylsiloxane (PDMS, Mw: 1670), 1.6 g of n-dodecylmercaptan as a chain transfer agent, and 2.4 g of azobisdimethylvaleronitrile as an initiator were additionally input into the reactor, and stirred at 400 rpm to blend. The blend was reacted at 60° C. for 3 hours to polymerize, and cooled to 30° C., thereby obtaining a bead-type second resin (A). Subsequently, the second resin (A) was washed with distilled water three times, dehydrated, and then dried in an oven.

A difference in surface energy between the first resin and the second resin (A) was 12 mN/m, a difference in melt viscosity was 325 pa*s, a glass transition temperature of the first resin was 70° C., a glass transition temperature of the second resin (A) was 102° C., a weight average molecular weight of the second resin (A) measured by GPC was 100 K, and polydispersity index (PDI) was 2.1.

(2) Preparation of Resin Blend and Measurement of Physical Properties 90 parts by weight of the first resin and 10 parts by weight of the second resin (A) were blended, and extruded using a twin screw extruder (Leistritz) at 240° C., thereby obtaining a pellet. In addition, the pellet was injected using an EC100Φ30 injector (ENGEL) at 240° C. to manufacture a resin molded article sample 1 having a thickness of 3200 μm. In the sample, a thickness of the second resin layer was 19 μm, a thickness of an interface layer was 8 μm, a pencil hardness was H, strengths were 9 kg*cm/cm in the case of IZOD ⅛" and 9 kg*cm/cm in the case of IZOD ¼", and a layer separation phenomenon was observed.

EXAMPLE 2

(1) Preparation of First and Second Resins and Measurement of Physical Properties A first resin was the same as Example 1, and a second resin (B) was prepared by the same method as described in Example 1, except that 784 g of methylmethacrylate and 16 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (B) was 14 mN/m, a difference in melt viscosity was 340 pa*s, a glass transition temperature of the second resin (B) was 101° C., a weight average molecular weight of the second resin (B) measured by GPC was 100 K, and polydispersity index was 2.2.

(2) Preparation of Resin Blend and Measurement of Physical Properties

A sample 2 having a thickness of 3200 μm was manufactured by the same method as described in Example 1, except that the second resin (B) was used. In the sample, a thickness of a second resin layer was 36 μm, a thickness of an interface layer was 27 μm, a pencil hardness was H, strengths were 9 kg*cm/cm in the case of IZOD ⅛" and 9 kg*cm/cm in the case of IZOD ¼", and a layer separation phenomenon was observed.

EXAMPLE 3

(1) Preparation of First and Second Resins and Measurement of Physical Properties A first resin was the same as Example 1, and a second resin (C) was prepared by the same method as described in Example 1, except that 776 g of methylmethacrylate and 24 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (C) was 15 mN/m, a difference in melt viscosity was 350 pa*s, a glass transition temperature of the second resin (C) was 99° C., a weight average molecular weight of the second resin (C) measured by GPC was 100 K, and a polydispersity index was 2.2.

(2) Preparation of Resin Blend and Measurement of Physical Properties

A sample 3 having a thickness of 3200 μm was manufactured by the same method as described in Example 1, except that the second resin (C) was used. In the sample, a thickness of a second resin layer was 43 μm, a thickness of an interface layer was 19 μm, a pencil hardness was 2H, strengths were 9 kg*cm/cm in the case of IZOD ⅛" and 9 kg*cm/cm in the case of IZOD ¼", and a layer separation phenomenon was observed.

EXAMPLE 4

(1) Preparation of First and Second Resins and Measurement of Physical Properties A first resin was the same as Example 1, and a second resin (D) was prepared by the same method as described in Example 1, except that 776 g of methylmethacrylate and 24 g of monothiol-terminated polydimethylsiloxane (Mw: 1900) were used instead of 792 g of methylmethacrylate and 8 g of dithiol-terminated polydimethylsiloxane (Mw: 1670).

A difference in surface energy between the first resin and the second resin (D) was 12 mN/m, a difference in melt viscosity was 330 pa*s, a glass transition temperature of the second resin (D) was 103° C., a weight average molecular weight of the second resin (D) measured by GPC was 100 K, and a polydispersity index was 2.3.

(2) Preparation of Resin Blend and Measurement of Physical Properties

A sample 4 having a thickness of 3200 μm was manufactured by the same method as described in Example 1, except that the second resin (D) was used. In the sample, a thickness of a second resin layer was 45 μm, a thickness of an interface layer was 33 μm, a pencil hardness was 2H, strengths were 9 kg*cm/cm in the case of IZOD ⅛" and 9 kg*cm/cm in the case of IZOD ¼", and a layer separation phenomenon was observed.

EXAMPLE 5

(1) Preparation of First and Second Resins and Measurement of Physical Properties A first resin was the same as Example 1, and a second resin (E) was prepared by the same method as described in Example 1, except that 576 g of methylmethacrylate, 200 g of cyclohexylmethacrylate, and 24 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (E) was 17 mN/m, a difference in melt viscosity was 470 pa*s, a glass transition temperature of the second resin (E) was 96° C., a weight average molecular weight of the second resin (E) measured by GPC was 100 K, and a polydispersity index was 2.1.

(2) Preparation of Resin Blend and Measurement of Physical Properties

A sample 5 having a thickness of 3200 μm was manufactured by the same method as described in Example 1, except that the second resin (E) was used. In the sample, a thickness of a second resin layer was 49 μm, a thickness of an interface layer was 35 μm, a pencil hardness was 2.5H, strengths were 9 kg*cm/cm in the case of IZOD ⅛" and 9 kg*cm/cm in the case of IZOD ¼", and a layer separation phenomenon was observed.

EXAMPLE 6

(1) Preparation of First and Second Resins and Measurement of Physical Properties A first resin was the same as Example 1, and a second resin (F) was prepared by the same method as described in Example 1, except that 576 g of methylmethacrylate, 200 g of phenylmethacrylate, and 24 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (F) was 20 mN/m, a difference in melt viscosity was 455 pa*s, a glass transition temperature of the second resin (F) was 102° C., a weight average molecular weight of the second resin (F) measured by GPC was 100 K, and a polydispersity index was 2.1.

(2) Preparation of Resin Blend and Measurement of Physical Properties

A sample 6 having a thickness of 3200 μm was manufactured by the same method as described in Example 1, except that the second resin (F) was used. In the sample, a thickness of a second resin layer was 50 μm, a thickness of an interface layer was 32 μm, a pencil hardness was 2.5H, strengths were 9 kg*cm/cm in the case of IZOD ⅛" and 9 kg*cm/cm in the case of IZOD ¼", and a layer separation phenomenon was observed. A peak strength ratio $[I_{BD}(C=C)/I_A(C=O)]$ had an average value of 0.0121 and a standard deviation of 0.0005, and a peak strength ratio $[I_{BD}(\text{out-of-plane})/I_A(C=O)]$ had an average of 0.413 and a standard deviation of 0.0029, which were measured by an IR spectrophotometer.

EXAMPLE 7

(1) Preparation of First and Second Resins and Measurement of Physical Properties A first resin was the same as Example 1, and a second resin (G) was prepared by the same method as described in Example 1, except that 536 g of methylmethacrylate, 120 g of acrylamide, 120 g of hydroxyethyl methacrylate, and 24 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (G) was 6 mN/m, a difference in melt viscosity was 395 pa*s, a glass transition temperature of the second resin (G) was 122° C., a weight average molecular weight of the second resin (G) measured by GPC was 100 K, and a polydispersity index was 1.9.

(2) Preparation of Resin Blend and Measurement of Physical Properties

A sample 7 having a thickness of 3200 µm was manufactured by the same method as described in Example 1, except that the second resin (G) was used. In the sample, a thickness of a second resin layer was 65 µm, a thickness of an interface layer was 28 µm, a pencil hardness was 1.5H, strengths were 7 kg*cm/cm in the case of IZOD ⅛" and 7 kg*cm/cm in the case of IZOD ¼", and a layer separation phenomenon was observed.

EXAMPLE 8

(1) Preparation of First and Second Resins and Measurement of Physical Properties A first resin was the same as Example 1, and a second resin (H) was prepared by the same method as described in Example 1, except that 536 g of methylmethacrylate, 240 g of hydroxyethyl methacrylate, and 24 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (H) was 7 mN/m, a difference in melt viscosity was 450 pa*s, a glass transition temperature of the second resin (H) was 108° C., a weight average molecular weight of the second resin (H) measured by GPC was 100 K, and a polydispersity index was 1.9.

(2) Preparation of Resin Blend and Measurement of Physical Properties

A sample 8 having a thickness of 3200 µm was manufactured by the same method as described in Example 1, except that the second resin (H) was used. In the sample, a thickness of a second resin layer was 54 µm, a thickness of an interface layer was 30 µm, a pencil hardness was 2H, strengths were 9 kg*cm/cm in the case of IZOD ⅛" and 9 kg*cm/cm in the case of IZOD ¼", and a layer separation phenomenon was observed.

EXAMPLE 9

(1) Preparation of First and Second Resins and Measurement of Physical Properties A first resin was the same as Example 1, and a second resin (I) was prepared by the same method as described in Example 1, except that 536 g of methylmethacrylate, 120 g of vinylpyrrolidone, 120 g of hydroxyethyl methacrylate, and 24 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (I) was 6 mN/m, a difference in melt viscosity was 410 pa*s, a glass transition temperature of the second resin (I) was 110° C., a weight average molecular weight of the second resin (I) measured by GPC was 100 K, and a polydispersity index was 2.2.

(2) Preparation of Resin Blend and Measurement of Physical Properties

A sample 9 having a thickness of 3200 µm was manufactured by the same method as described in Example 1, except that the second resin (I) was used. In the sample, a thickness of a second resin layer was 62 µm, a thickness of an interface layer was 32 µm, a pencil hardness was 2H, strengths were 8 kg*cm/cm in the case of IZOD ⅛" and 8 kg*cm/cm in the case of IZOD ¼", and a layer separation phenomenon was observed.

COMPARATIVE EXAMPLE 1

A sample 10 having a thickness of 3200 µm was manufactured by drying 100 parts by weight of the same first resin pellet as used in Example 1 in an oven and injecting the dried pellet by an EC100Φ30 injector (ENGEL) at 240° C.

As the result of measuring physical properties of Sample 10 manufactured above, a glass transition temperature (Tg) was 70° C., strengths were 10 kg*cm/cm in the case of IZOD ⅛" and 10 kg*cm/cm in the case of IZOD ¼", and a pencil hardness was F.

COMPARATIVE EXAMPLE 2

The same first resin used in Example 1 was used as a first resin, and a second resin (J) was prepared by the same method as described in Example 1, except that 640 g of methylmethacrylate and 160 g of dithiol-terminated polydimethylsiloxane (Mw: 1670) were used instead of 792 g of methylmethacrylate and 8 g of dithiol-terminated polydimethylsiloxane (Mw: 1670).

A difference in surface energy between the first resin and the second resin (J) was 22 mN/m, a difference in melt viscosity was 620 pa*s, and a glass transition temperature of the second resin (J) was 45° C. A weight average molecular weight of the second resin (J) measured by GPC was 100 K, and a polydispersity index was 4.2.

(2) Preparation of Resin Blend and Measurement of Physical Properties

A sample 11 having a thickness of 3200 µm was manufactured by the same method as described in Example 1, except that the second resin (J) was used. In the sample, a layer separation phenomenon could not be observed because the sample was peeled, and a pencil hardness could not be measured, either. In addition, neither a second resin layer nor an interface layer could not be measured in terms of thickness. Strengths were 3 kg*cm/cm in the case of IZOD ⅛", and 2 kg*cm/cm in the case of IZOD ¼".

COMPARATIVE EXAMPLE 3

The same first resin used in Example 1 was used as a first resin, and polymethylmethacrylate (LGMMA IF870) was used as a second resin. There was no difference in surface energy between the first and second resins, a difference in melt viscosity was 270 pa*s, and a glass transition temperature of the second resin was 104° C. A weight average molecular weight of the second resin measured by GPC was 73 K, and a polydispersity index was 1.9.

(2) Preparation of Resin Blend and Measurement of Physical Properties

A sample 13 having a thickness of 3200 µm was manufactured by the same method as described in Example 1, except that the polymethylmethacrylate was used. In the sample, no layer separation phenomenon was observed. In addition, neither a second resin layer nor an interface layer could not be measured in terms of thickness. A pencil hardness was H. Strengths were 5.2 kg*cm/cm in the case of IZOD ⅛", and 4.9 kg*cm/cm in the case of IZOD ¼".

COMPARATIVE EXAMPLE 4

A sample was manufactured by drying 100 parts by weight of the same first resin pellet as used in Example 1 in an oven and injecting the dried pellet by an EC100Φ30 injector (ENGEL) at 240° C.

A hard coating film was formed by forming a film by coating a self-prepared contamination resistant hard coating solution (17.5 wt % of dipentaerythritol hexylacrylate (DPHA), 10 wt % of pentaerythritol triacrylate (PETA), 1.5 wt % of perfluorohexylethyl methacrylate, 5 wt % of urethaneacrylate, EB 1290 produced by SK Cytech, 45 wt % of methyl ethyl ketone, 20 wt % of isopropylalcohol, and 1 wt % of a UV initiator, IRGACURE184 produced by Ciba) including a multifunctional acrylate with a Mayer bar #9 on the sample and drying the coated film at 60 to 90° C. for 4 minutes, and curing the coating solution composition through UV radiation with an intensity of 3,000 mJ/cm².

A pencil hardness of the hard coating film was 3H, and both of an average value and a standard deviation of peak strength ratios $[I_{BD}(C=C)/I_A(C=O)]$ and $[I_{BD}(\text{out-of-plane})/I_A(C=O)]$ measured by an IR spectrophotometer were 0.

The invention claimed is:

1. A resin blend, comprising:
   a first resin; and
   a second resin having a hydrophobic moiety represented by Formula 1 at a main chain and having a difference in surface energy from the first resin at 25° C. of 6 to 20 mN/m and a polydispersity index of 1.9 to 2.3,
   wherein the second resin is a polymer and the hydrophobic moiety is introduced to the main chain of the second resin using a monomer represented by Formula 2, and
   wherein the resin blend forms a layer-separated structure during a melt processing performed under a shear stress,
   wherein the first resin is a styrene-based resin and the second resin is a methyl (meth)acrylate-based resin, and a difference in melt viscosity between the first and the second resins is 325 to 600 pa*s at a shear rate of 100 to 1000 s⁻¹ and at a processing temperature of the resin blend of 210° C. to 240° C., and
   wherein the hydrophobic moiety represented by Formula 1 is included at 0.01 to 15 parts by weight based on 100 parts by weight of the second resin:

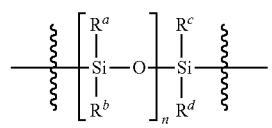

[Formula 1]

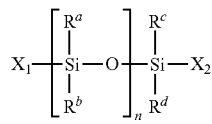

[Formula 2]

wherein $R^a$ to $R^d$ are each independently an alkyl group having 1 to 16 carbon atoms, n is a number of 1 to 100, and $X_1$ and $X_2$ are hydrogen, an alkyl group having 1 to 16 carbon atoms, or a mercapto (—SH) group, but at least one of the $X_1$ and $X_2$ is a mercapto group.

2. The resin blend according to claim 1, wherein the second resin has a higher glass transition temperature than the first resin, and a difference in glass transition temperature between the first and the second resins is 10 to 150° C.

3. The resin blend according to claim 1,
   wherein the second resin has a weight average molecular weight of 30,000 to 200,000.

4. The resin blend according to claim 1,
   wherein the second resin further includes at least one organic functional group selected from the group consisting of an alkyl group having 2 to 20 carbon atoms, an alicyclic ring having 5 to 40 carbon atoms, and an aromatic ring having 6 to 40 carbon atoms.

5. The resin blend according to claim 1,
   wherein the second resin further includes hydrogen-binding donor and acceptor.

6. A method of manufacturing a resin molded article, comprising:
   forming a melt blend by melting the resin blend of claim 1; and
   forming a layer-separated structure by processing the melt blend.

7. The method according to claim 6, further comprising curing the layer-separated structure of the resin blend.

8. The method according to claim 6,
   wherein the melting and processing are performed under a shear stress.

9. The method according to claim 7,
   wherein the curing is thermal curing or UV curing.

10. A resin molded article having a layer-separated structure, comprising: a first resin layer including the first resin of claim 1;
    a second resin layer including the second resin of claim 1 formed on the first resin layer;
    and an interface layer comprising the resin blend of claim 1, and formed between the first and the second resin layers, wherein the layer-separated structure is formed during the melt processing performed under a shear stress of the resin blend of claim 1.

11. The resin molded article according to claim 10, wherein the first resin layer component is detected on a surface of the second resin layer by an infrared spectrophotometer.

* * * * *